Dec. 9, 1947.   R. S. ANDRUS   2,432,269
SAW SETTING TOOL
Filed May 14, 1946   3 Sheets-Sheet 1
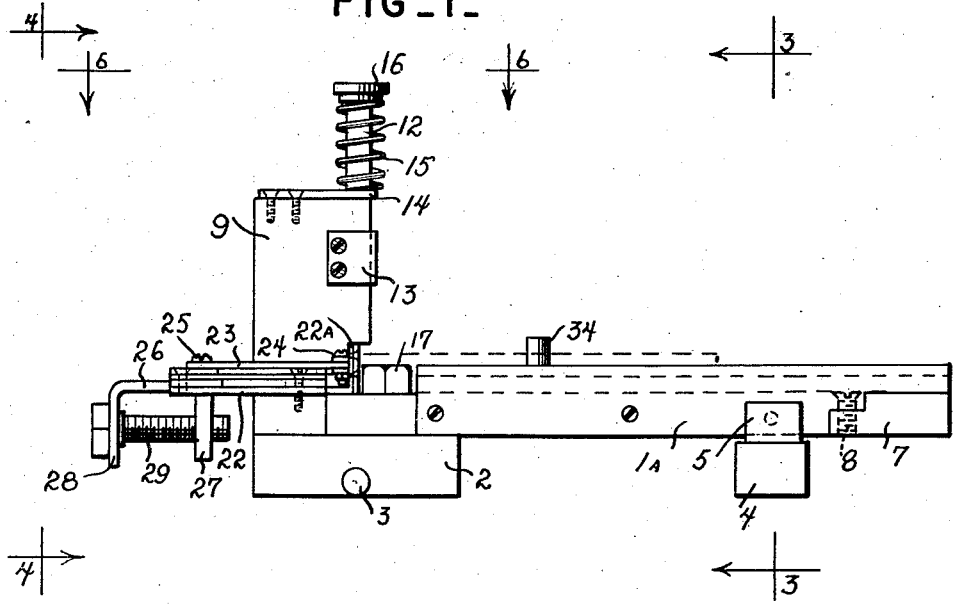
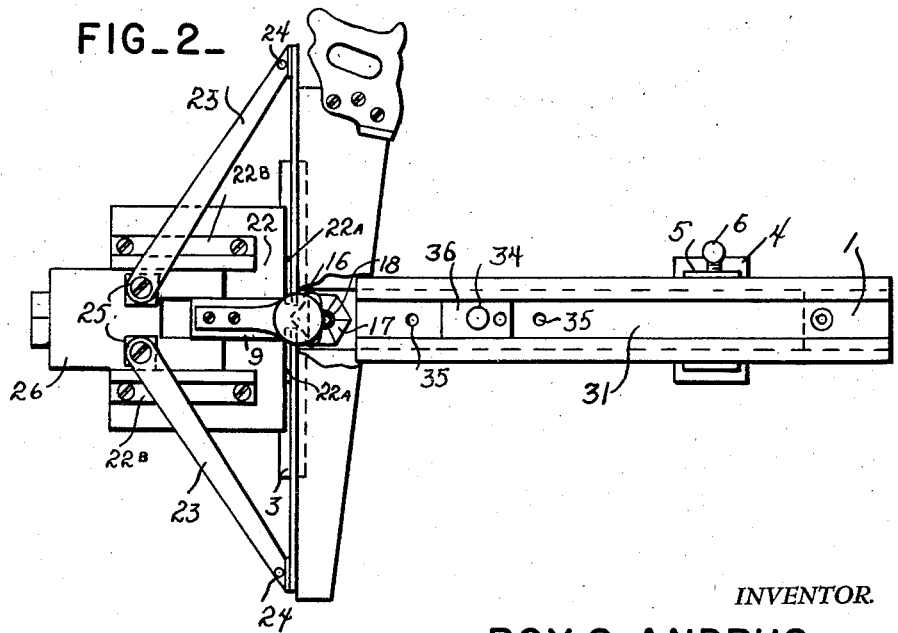
*INVENTOR.*
ROY S. ANDRUS
BY *Victor J. Evans & Co.*
ATTORNEYS Dec. 9, 1947.  R. S. ANDRUS  2,432,269
SAW SETTING TOOL
Filed May 14, 1946  3 Sheets-Sheet 2
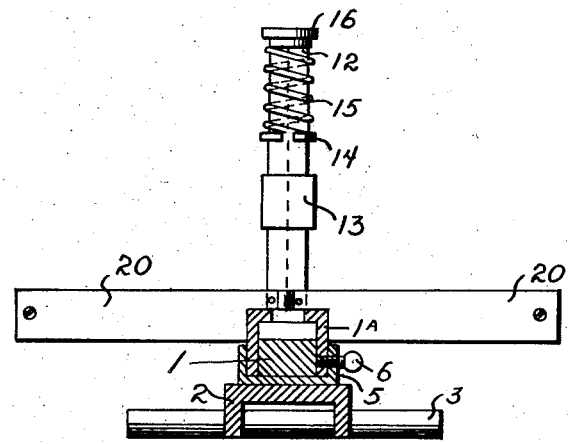
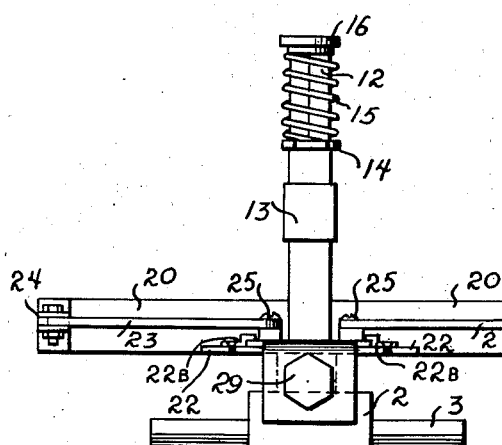
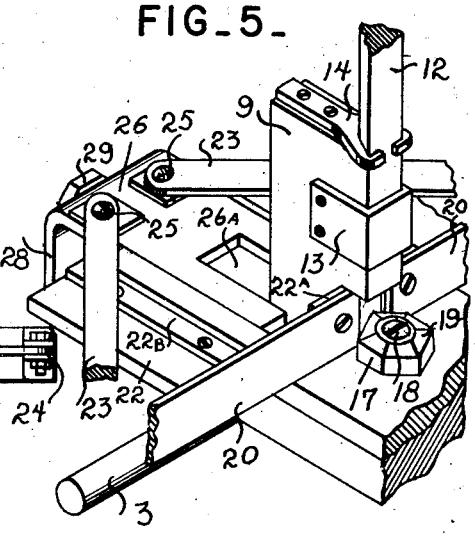
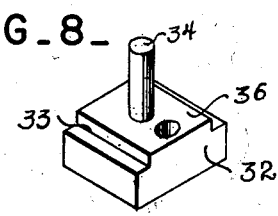
INVENTOR.
ROY S. ANDRUS
BY *Victor J. Evans & Co.*
ATTORNEYS

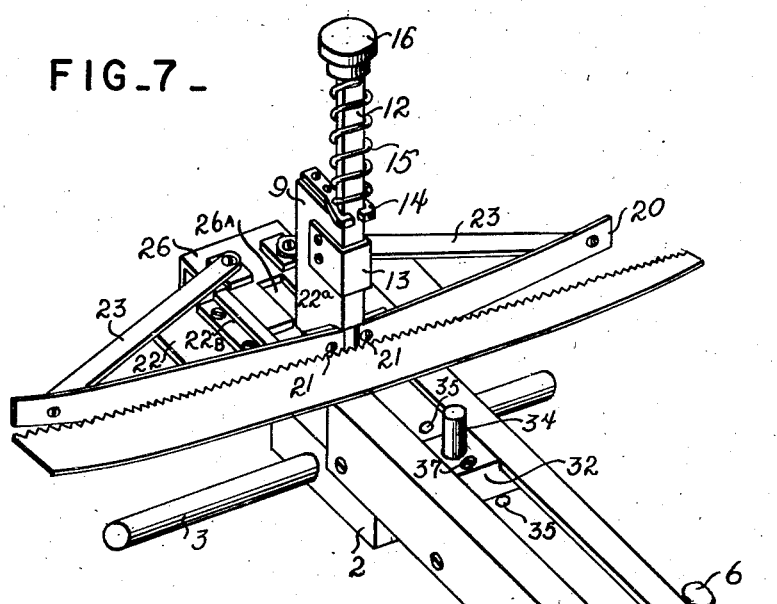
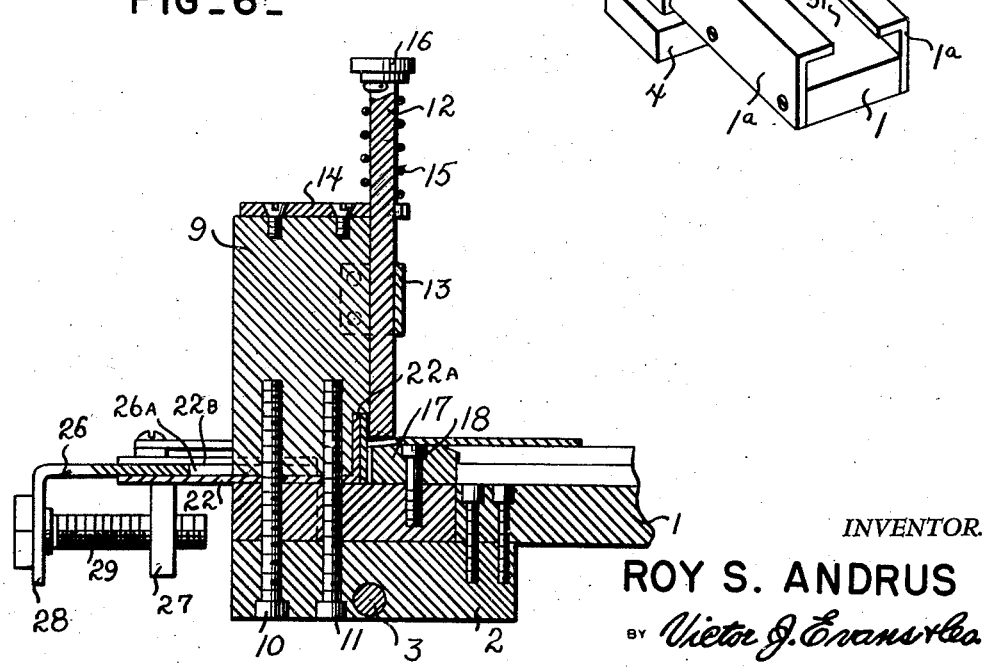
INVENTOR.
ROY S. ANDRUS

Patented Dec. 9, 1947

2,432,269

UNITED STATES PATENT OFFICE 2,432,269

SAW SETTING TOOL

Roy S. Andrus, Tacoma, Wash.

Application May 14, 1946, Serial No. 669,655

3 Claims. (Cl. 76—70)

The present invention relates to an improved saw setting tool of the portable, manually operated type, and employing a blow from a hammer for setting the saw teeth. Means are utilized whereby the tool may readily be adapted for setting the teeth of band saws, pruning saws, compass saws, cross cut, circular, and hand saws, and a single, adjustable guide is provided for use with these various types of straightedge saws as well as curved edge saws.

The primary object of the invention is the provision of a device of this character which comprises a minimum number of parts that may be manufactured with facility and at low cost of production, and which parts may readily be assembled to provide an efficient tool that is comparatively simple in construction and operation.

The invention consists in certain novel combinations and arrangements of component parts as will hereinafter be more fully set forth and claimed.

In the accompanying drawings I have illustrated one complete example of the physical embodiment of my invention wherein the parts are combined and arranged in accord with one mode I have thus far devised for the practical application of the principles of my invention, but it will be understood that changes and alterations may be made in these exemplifying drawings and mechanical structures within the scope of my appended claims without departing from the principles of my invention.

Figure 1 is a view in side elevation of a saw setting tool in which my invention is embodied.

Figure 2 is a top plan view of the tool in Fig. 1 showing a hand saw with a straight edge in position for setting of its teeth.

Figure 3 is a rear end elevation, and Figure 4 is a front end elevation of the tool.

Figure 5 is a detail perspective view, with parts broken away, showing the relation of the plunger and anvil with the adjustable guide or fence for the saw.

Figure 6 is a vertical sectional view, longitudinally of the tool, showing construction of parts at the head of the tool.

Figure 7 is a perspective view of the tool adjusted to accommodate a pruning saw.

Figure 8 is a perspective view of one of the centering blocks, detached, for use with a circular saw.

In carrying out my invention I utilize an elongated metal bar 1, rectangular in cross section to which are attached, by screws, a pair of angle plates 1a, 1a, in order to form a body or base having an upper channel or way that terminates adjacent the working head of the tool. The bed is provided with substantial supports, one of which is a foot block 2 that is rigidly fixed by screws to the bed, and this supporting block is equipped with a transversely extending cross bar 3 that projects laterally of the block to prevent tilting of the tool.

A second, adjustable, block 4 is provided for the bed, and this block may be spaced from the fixed supporting block 2 as desired. The adjustable block is fashioned with integral opposed wings 5, 5 that fit neatly over the sides of the bed to retain the block on the bed, and a set bolt or screw 6 is threaded through one of these wings to impinge against the outer face of the bed for holding the block in fixed adjusted position.

In Fig. 1 means are indicated for extending the length of the bed in adapting the tool for various purposes, and an extension section 7 is connected by a mortise and tenon joint to the bed, which extension is secured by screw 8 shown in dotted lines.

At the working end of the tool an upright head 9 is rigidly fixed to the bed 1 and block 2 by means of bolts or screws 10, 11, Fig. 6, which bolts unite the parts to provide a substantial working head to withstand blows of the hammer used in setting the saw teeth.

The upright head 9 is fashioned with a vertical bore to accommodate the spring retracted plunger or setting bar 12, which may be angular in cross section, or other means may be employed to prevent rotary movement of the plunger, and to insure proper position of the biased setting end of the bar or bolt 12.

When an open front bore is used in the head, a guide strap 13 is mounted across the open front of the bore and secured by screws to the head; and a top guide plate 14 with a forked or bifurcated end through which the setting bar or bolt passes, is also secured by screws to the head, to guide the setting bolt and maintain its proper position for striking.

For retracting the setting bolt or bar a spring 15 is coiled about the upper end of the bolt and interposed between the striking head 16 and the forked plate or guide 14, and the spring lifts the setting bolt in usual manner after a blow from a hammer on the striking head.

The saw rest or anvil 17 is located beneath the setting bolt, where it is pivotally mounted on a screw or bolt 18 threaded into a portion of the head of the tool so that it may be pivotally adjusted or turned to present one of several multi-faces 19 for co-action with the lower end of the setting bolt. The multi faces 19 vary in pitch and they are adapted for selective use with the teeth of saws of different types; and the pivotally adjusted anvil or rest may be turned and fixed in adjusted position to adapt the tool to the variations in the saw teeth.

For adapting the tool to different types of saws having straight edges, or curved edges, I employ a flexible and adjustable fence or guide-wall 20 that may be flexed from a straight structure into a concave wall or into a convex wall for adaptation to complementary cutting edges of the saws to be set.

As shown in the drawings the guide wall may be a flat narrow plate or thin strip of spring steel that is disposed transversely of the longitudinal base or bed, and secured as by screws at its center 21 to the flange 22a of a base plate 22, forming part of the head; or the guide wall may be made up of two alined strips each having its inner end secured to the flange 22a, Fig. 5.

The guide wall, which stands in a vertical plane, is of sufficient height to afford a fence or guide to saws with cutting edges of varying thicknesses, and the portions of the wall at opposite sides of its fixed center may be swung into concave shape, or into convex shape by means of two diverging arms 23, 23, having their outer ends pivoted at 24, 24, to the outer ends of the wall.

The inner converging ends of these arms are pivoted at 25, 25 on the upper face of a slide block or plate 26 that is adjustable longitudinally of the bed and mounted for adjustment in grooves 22b in the base plate 22 of the head. The slide block or plate is fashioned with a slot 26a to receive the head 9.

The base plate 22 is provided rearwardly of the head 9, with a downwardly extending nut 27, and the slide block or plate 26 is provided at its rear end with a downwardly extending flange 28. A bolt 29 is swivelled in the flange 28 and engages the nut 27. The slide block or plate 26, nut 27, bolt 29 and arms 23 constitute means through the medium of which the guide wall 20 is adjusted or fixed to conform to the configuration of the toothed edge of the saw to be set. By turning the bolt in its bearing it will be apparent that the slide block 26 may be moved to cause the arms 23, 23, to pull the guide wall into a convex formation, or to push the guide wall into a concave formation with relation to the cutting edge of the saw being set.

For use with a circular saw, as indicated by dotted lines in Fig. 1, a dove-tail groove 31 extending longitudinally along the upper face of the bed, is employed, and an adjustable slide block 32, having edge grooves 33 for co-action with the overhanging tongues of the plates 1a, may be slid to adjusted position within the groove 31. A centering pin 34, or a stud threaded into the block, is utilized to receive the open center of the circular saw which rests upon the bed with its cutting edge over the anvil 17, and the saw may be turned with the pin or stud as a center as the setting operation progresses.

For different diameters of saws, the bed may be provided with a series of spaced bolt holes 35, and the slide block 32 is provided with a bolt hole 36, to accommodate a bolt 37 by means of which the centering block may be clamped in desired or adjusted position; and in some instances a bushing may be slipped over the pin or stud 34 to compensate for the size of the center hole in the circular saw.

Having thus fully described my invention, what I claim as new and desire to secure by Letters Patent is:

1. A saw setting tool comprising an elongated bar, angle plates extending upwardly from the sides of the bar to provide a groove therealong, a foot block fixed to one end of the bar to serve as a support therefor, a second foot block adjustably connected to the bar and adapted to be fixed to the angle plates thereon whereby to elevate the outer end of the bar to the same height as the forward end is elevated by the fixed foot block, the transversely extending cross bar projecting laterally through the fixed foot block to prevent the tool from tilting when being used, said transverse bar being aligned immediately above the bottom face of the foot block, a member fixed to the foot block and extending thereabove and into alignment with the elongated bar, an anvil connected to the said member and serving as a rest for the saw teeth, a base plate extending laterally and rearwardly from the top of the member, an upright head secured over said base plate, and fastening means extending through the foot block, the member, the base plate and the head to secure the assembly together, said head having a recess to the lower part of its front edge, a flange extending upwardly from the base plate and into said recess and extending in wing formation from the sides of said head, guide wall members secured at their inner ends to the sides of the base plate flange, a setting bolt secured to the head in vertical alignment with the anvil and a saw tooth that may be disposed hereon, diverging arms pivotally connected to the outer ends of the guide wall members, guide means on the base plate, a slide block adjustable on the base plate, adjustable means for adjusting the slide block, and said diverging arms pivotally connected to the opposite sides of said block, said angle plates serving as a rest for the saw over the anvil.

2. A saw setting tool as defined in claim 1 and an adjustable slide block between said angle plates on said bar, means for fixing the block to said bar in any one of several adjusted positions therealong, a centering pin extending upwardly from said slide block and adapted to receive the open center of a circular saw.

3. A saw setting tool as defined in claim 1 and said means for adjusting said slide block comprising a nut secured to the bottom of said base plate, said slide block having a downwardly turned end, and an adjusting screw extending between the downwardly turned end of the slide block and said nut depending from the base plate.

ROY S. ANDRUS.

REFERENCES CITED

The following references are of record in the file of this patent:

UNITED STATES PATENTS

| Number | Name | Date |
|---|---|---|
| 504,521 | Dillon | Sept. 5, 1893 |
| 977,233 | Stecker | Nov. 29, 1910 |
| 1,017,761 | Johnson | Feb. 20, 1912 |
| 1,029,614 | Johnson | June 18, 1912 |
| 1,098,233 | Devini | May 26, 1914 |
| 1,159,974 | Martin | Nov. 9, 1915 |
| 1,263,191 | Benner | Apr. 16, 1918 |
| 1,280,079 | Patterson | Sept. 24, 1918 |
| 1,323,656 | Sultzman | Dec. 2, 1919 |
| 1,334,905 | Kaiser | Mar. 23, 1920 |
| 1,453,958 | Thomas | May 1, 1923 |